United States Patent [19]

Buehler et al.

[11] 3,717,624
[45] Feb. 20, 1973

[54] REACTIVE AZO COMPOUNDS CONTAINING AN ACETOACETYL GROUP

[75] Inventors: Arthur Buehler, Rheinfelden; Rene' De Montmollin, Riehen, both of Switzerland

[73] Assignee: Ciba-Geigy AG., Basle, Switzerland

[22] Filed: Feb. 3, 1970

[21] Appl. No.: 8,408

[30] Foreign Application Priority Data

Feb. 13, 1969 Switzerland..........................2166/69

[52] U.S. Cl..........................260/153, 8/41 R, 8/50, 260/154, 260/157, 260/158, 260/163, 260/193

[51] Int. Cl.....C09b 62/02, C09b 62/70, C09b 62/78

[58] Field of Search.......260/153, 154, 193, 157, 158

[56] References Cited

UNITED STATES PATENTS

| | | | |
|---|---|---|---|
| 2,154,981 | 4/1939 | Gubler et al. | 260/153 X |
| 2,167,804 | 8/1937 | Gubler et al. | 260/153 |
| 2,617,798 | 11/1952 | Mueller et al. | 260/193 |
| 3,151,105 | 9/1964 | Andrew et al. | 260/153 |
| 2,316,758 | 4/1943 | Besler | 260/193 |
| 2,347,027 | 4/1944 | Bester | 260/193 |
| 2,798,064 | 7/1957 | Mueller | 260/154 X |
| 3,065,191 | 11/1962 | Heslop et al. | 260/153 |

*Primary Examiner*—Floyd D. Higel
*Attorney*—Harry Goldsmith, Joseph G. Kolodny and Mario A. Monaco

[57] ABSTRACT

An azo compound of the formula

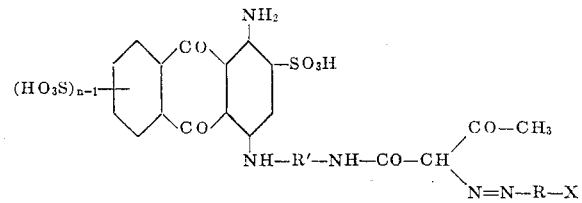

containing at least two sulfonic acid groups; in which X represents a fiber-reactive residue, $n = 1$ or 2, R' is phenyl, diphenyl or stilbene, or substituted phenyl, diphenyl or stilbene wherein the substituent is selected from the group consisting of chloro, methyl, carboxylic acid or sulfonic acid and R is phenyl, sulfophenyl or substituted phenyl or sulfophenyl wherein the substituent is selected from the group consisting of chloro, methyl, methoxy, hydroxy or sulfonic acid. The dyestuffs are suitable for dyeing by the cold pad batch method. The dyestuffs are suitable for dyeing or printing of materials of animal origin such as leather, silk and wool, as well as cellulosic material. The dyestuffs display excellent fastness to light and wetting.

16 Claims, No Drawings

REACTIVE AZO COMPOUNDS CONTAINING AN ACETOACETYL GROUP

The present invention provides valuable new azo compounds of the formula

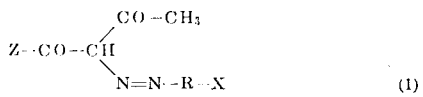

(1)

in which Z represents the residue of a compound of the anthraquinone series linked through an amino group, R represents an arylene group and X represents a fiber-reactive residue linked to R preferably through an amino group, which compounds of the formula (1) contain two or more sulphonic acid groups distributed in any desired way in the molecule. The compounds may be further described as azo compounds of the formula

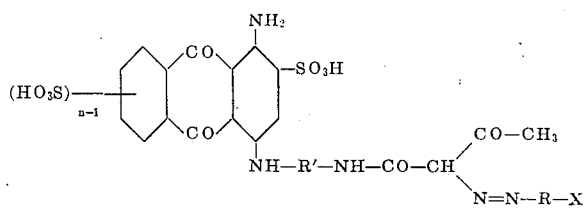

containing at least two sulfonic acid groups; in which X represents a fiber-reactive residue selected from the group consisting of aliphatic $\alpha,\beta$-unsaturated or halogenated $C_{1-4}$acyl, 3-nitro- or 3,5-dinitro-4-chlorobenzoyl or -benzenesulfonyl, 4,5-dichloro-1-pyridazone, $-CH_2-NH-CO-CH_2Cl$, vinylsulphone, $\beta$-sulphato- or $\beta$-thiosulphato-ethylsulphone, $\beta$-thiosulphatopropionylamide, $\beta$-thiosulphatoethylsulphonylamide, sulphonic acid-N,$\beta$-sulphatoethylamide and 5- or 6-membered heterocyclic ring containing at least two hetero atoms, which can be fused with an aromatic ring and which contains at least one fiber-reactive group selected from the group consisting of chlorine, bromine and alkylsulfonyl, and which is bound to R through an —NH— or —NH—CO— bridge; and may be further substituted by $-NH_2$, $-SH$, $-OH$, —NH—alkyl, alkoxy, thioalkoxy, dialkylamino, phenyl- or sulfophenylamino, phenoxy, phenylthio, alkyl, phenyl, nitro or cyano groups wherein alkyl is from one to four carbon atoms and may be substituted by —OH or alkoxy. The fiber-reactive residue may be further described as $\alpha,\beta$-dibromopropionyl, $\alpha$-bromoacryl, 1-methoxy-3-chloro-s-triazin(5)-yl, 1-($\beta$-ethoxy)-ethoxy-3-chloro-s-triazin(5)-yl or 1-sulphophenylamino-3-chloro-s-triazin(5)-yl group bound to R through an —NH group.

The present invention provides a process for preparing the compounds of the formula (1), wherein a compound of the formula

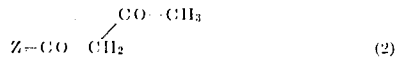

(2)

in which Z has the meaning given above, is coupled by a method known per se with the diazo compound of an amine of the formula

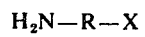

(3)

in which R and X have the meanings defined above, to form azo compounds of the formula (1).

Of special value are those new compounds of the formula (1) which contain as arylene group R a sulphophenylene group. Suitable fiber-reactive residues may be aliphatic, for example, unsaturated, halogenous, as well as cyclic, for example, heterocyclic residues.

The starting compounds of the formulas (2) or (3) used as coupling components may be obtained by acetoacetylation of a compound containing one or more amino groups or of a couplable compound containing one or more amino groups by means of diketene. The reaction with diketene is carried out by a method known per se, for example, in glacial acetic acid or by the process described in German specification No. 749,975 or in DAS No. 1,262,747, advantageously in an aqueous solution at a low temperature and in an acidic to weakly alkaline solution, if required, with addition of an acid buffer, for example, in pyridine, sodium acetate, sodium bicarbonate or sodium carbonate. In some cases the acetoacetylation may also be performed at an elevated temperature.

Especially suitable as starting materials for the present process are anthraquinones containing sulphonic acid groups which are bound through an amino group with the acetoacetyl residue. As examples of anthraquinones suitable for use as starting compounds the acetoacetylamides of the following anthraquinones may be mentioned:

1- or 2-aminoanthraquinone, 1,4-diaminoanthraquinone, 1,4-diaminoanthraquinone-2-sulphonic acid, 1,4-diaminoanthraquinone-2,5-, -2,6-, -2,7- or 2,8-disulphonic acid, 1,5-diamino-4,8-dihydroxyanthraquinone, 1,5-diaminoanthraquinone-2-sulphonic acid, 1,4-bis-(4'-aminophenylamino)-anthraquinone-2,2'-disulphonic acid, 1-amino-4-(4'-aminophenylamino)-anthraquinone-2,2',6- and -2,2',7-trisulphonic acid, 1-amino-4-(4'-aminophenylamino)-anthraquinone-2-sulphonic acid, 1-amino-4-(4''-aminodiphenylamino)-anthraquinone-2,3''-disulphonic acid, 1-amino-4-(4'-aminophenylamino)-anthraquinone-2,2'-disulphonic acid-6''-carboxylic acid, 1-amino -4-(4'-aminophenylamino)-anthraquinone-2,6-disulphonic acid-2'-carboxylic acid, 1-amino-4-(4'-aminophenylamino)-anthraquinone-2,7-disulphonic acid-2'-carboxylic acid, 1-amino-4-(4''-aminostilbeneamino)-anthraquinone-2,2',2''-trisulphonic acid, 1-amino-4-(4'-aminophenylamino)-anthraquinone-2,3'-disulphonic acid, 1-amino-4-(4'-amino-2',3',5',6'-tetramethylphenylamino)-anthraquinone-2,6- and -2,7-disulphonic acid amino-4-(3'-amino-2',4',6'-trimethyl-phenylamino)-anthraquinone-2,5'-disulphonic acid, 1-amino-4-(3'-amino-4'-chlorophenylamino)-anthraquinone-2,5'-disulphonic acid, 1-amino-4-(4'-aminophenylamino)-anthraquinone-2-sulphonic acid-2'-carboxylic acid and 1,4-bisphenylamino-anthraquinone-4',4''-diamino-3',3''-disulphonic acid.

When the starting compound contains two acetoacetylamino groups and it is subjected to complete coupling, there are similarly obtained compounds of the formula (1) that contain two fiber-reactive groups.

The fiber-reactive diazo components which, according to the invention, are to be combined with a coupling component of the formula (2) are preferably manufactured by the condensation of an acylating agent containing fiber-reactive residues with a diaminoaryl compound by a method known per se, for example, in an aqueous medium with addition of an acid acceptor, for example, sodium hydroxide of sodium carbonate. Examples of suitable diaminoaryl compounds are the following:

diaminonaphthalenes such as 1,5-, 1,6-, 2,6- or 2,7-diaminonaphthalene, 1,5-diamino-4,8-dihydroxynaphthalene, diaminonaphthalenesulphonic acids, for example, 2,5-diaminonaphthalene-4-sulphonic acid, phenylenediamines and preferably sulphophenylenediamines which may contain further substituents, for example, alkyl, alkoxy, or hydroxyl groups or halogen atoms, for example, 1,3- or 1,4-diaminobenzene, 1,4-diamino-2-methylbenzene, 1,4-diamino-2-methoxybenzene, 1,3-diamino-5-methoxybenzene, 1,3-diamino-5-chlorobenzene, 1,4-diamino-2-hydroxybenzene, 1,4-diamino-3-methylbenzene-6-sulphonic acid, 1,4-diamino-3-chlorobenzene-6-sulphonic acid, 1,4- or 1,5-diaminobenzene-2-sulphonic acid, 1,4-diaminobenzene-2,5-disulphonic acid, 1,3-diaminobenzene-4,6-disulphonic acid, 1,4-diaminobenzene-2,6-disulphonic acid, 1,4-diamino-3-hydroxybenzene-6-sulphonic acid, benzidine-2,2'- or -3,3'-disulphonic acid and orthotolidine-3,3'-disulphonic acid.

Suitable diaminoaryl compounds are also, for example, aminobenzenes or aminonaphthalenes that contain further aromatic and/or heterocyclic residues which may be linked through azo groups, for example 1-(2'-methyl-3'-amino-5'-sulphophenyl)-3-methyl-4-(2-sulpho-5-aminophenylazo)-pyrazolone(5) or 4,4'-diaminodiphenyl-2,2'-disulphonic acid.

As acylating agents containing a fiber-reactive residue, the following, for example, aliphatic $\alpha,\beta$-unsaturated or halogenated $C_{1-4}$acyl, may be mentioned: chloro- or bromo-acetylchloride, $\beta$-chloro- or $\beta$-bromopropionylchloride, $\alpha,\beta$-dichloro- or $\alpha,\beta$-dibromo-propionylchloride, acrylchloride, $\alpha$-chloro- or $\alpha$-bromo-acrylchloride, $\beta$-chloro- or $\beta$-bromo-acrylchloride, trichloro-acrylchloride, $\alpha,\beta$-dichloro- or $\alpha,\beta$-dibromoacrylchloride, chlorocrotonyl-chloride, propiolylchloride, 3,5-dinitro-4-chlorobenzene-sulphonic or -carboxylic acid chloride, 3-nitro-4-chloro- benzene-sulphonic or -carboxylic acid chloride, 2,2,3,3-tetrafluorocyclobutane-1-carboxylic acid chloride, $\beta$-chloroethylsulphonyl-endomethylene-cyclohexanecarboxylic acid chloride, acrylsulphonyl-endomethylene-cyclohexane-carboxylic acid chloride, and especially heterocyclic acid halides and their derivatives, such as 5- or 6-membered heterocyclic rings containing at least two hetero atoms which can be fused with an aromatic ring and which contain at least one fiber-reactive group; for example, the 2-chlorobenz -oxazole-carboxylic acid chlorides, 2-chlorobenz-thiazole-carboxylic or -sulphonic acid chlorides, and especially the following compounds which contain at least two nitrogen atoms as hetero atoms of a six-membered heterocycle:
4,5-dichloro-1-phenylpyridazone-carboxylic or -sulphonic acid chloride, 4,5-dichloropyridazone-propionic acid chloride, 1,4-dichloro-phthalazine-carboxylic or -sulphonic acid chloride, 2,3-dichloroquinoxaline-carboxylic or -sulphonic acid chloride, 2,4-dichloroquinazoline-carboxylic or -sulphonic acid chloride, 2-methanesulphonyl-4-chloro-6-methyl-pyrimidine, tetrachloropyridazine, 2,4-bis-methanesulphonyl-6-methylpyrimidine, 2,4,6-tri- or 2,4,5,6-tetrachloropyrimidine, 2,4,6-tri- or 2,4,5,6-tetrabromopyrimidine, 2-methanesulphonyl-4,5-dichloro-6-methylpyrimidine, 2,4-dichloropyrimidine-5-sulphonic acid, 5-nitro- or 5-cyano-2,4,6-trichloropyrimidine, 2,6-bis-methanesulphonyl-pyridine-4-carboxylic acid chloride, 5-nitro-6-methyl-2,4-dichloropyrimidine, 2,6-dichloropyrimidine-4-carboxylic acid chloride, 2,6-dichloropyrimidine-5-carboxylic acid chloride, 2,4-dichloropyrimidine-4-sulphonylchloride, 2,4-dichloropyrimidine-5-sulphonylchloride, 2,4,6-trichloro-1,3,5-triazine as well as 4,6-dichloro-1,3,5-triazines substituted in the two position by an aryl or alkyl group, for example, by a phenyl, methyl or ethyl residue, or by the residue of an aliphatic or aromatic mercapto compound linked through the sulphur atom, or hydroxy compound linked through the oxygen atom, or preferably substituted by the $NH_2$ group or by the residue of an aliphatic, heterocyclic or aromatic amino compound linked through the nitrogen atom. As such compounds whose residues may be linked with the triazine nucleus in the two position by reaction with a trihalogenotriazine there may be mentioned, for example, the following: aliphatic or aromatic mercapto or hydroxy compounds, for example, thioalcohols, thioglycollic acid, thiophenols, methyl alcohol, ethanol, isopropanol, glycollic acid, phenol, chlorophenols, nitrophenols, phenol-carboxylic and -sulphonic acids, naphthols and naphthalol-sulphonic acid, more especially ammonia and compounds containing acylable amino groups, for example, hydroxylamine, hydrazine, phenylhydrazine, phenylhydrazinesulphonic acid, glycol monoalkyl ether, methyl-, ethyl-, isopropyl-, methoxyethyl-, methoxypropyl-, amine, dimethyl-, diethyl-, methylphenyl-, ethylenephenyl-amine, chloroethylamine, ethanolamines, propanolamines, benzylamine, cyclohexylamine, morpholine, piperidine, piperazine, aminocarbonic acid esters, amino-acetic acid ethyl ester, aminoethanesulphonic acid, N-methylaminoethanesulphonic acid, and more especially aromatic amines, for example, aniline, N-methylaniline, toluidines, xylidines, chloranilines, para- and meta-aminoacetanilide, aminophenols, anisidine, phenetidine, and especially anilines that contain acid groups, for example, sulphobenzylamine, sulphanilic, methanilic and orthanilic acid, anilinedisulphonic acid, aminobenzylsulphonic acid, aniline-$\omega$-methanesulphonic acid, aminobenzoicdicarboxylic acids, naphthylamino-mono-, -di- and -tri-sulphonic acids, aminobenzoic acids, for example, 2-hydroxy-5-aminobenzoic acid, also colored compounds or compounds having dyestuff character, for example, 4-nitro-4'-aminostilbenedisulphonic acid, 2-nitro-4'-aminodiphenylamino-4,3'-stilbenedisulphonic acid, 2-nitro-4'-aminodiphenylamino-4,3'-disulphonic acid and especially aminoazo dyestuffs or aminoanthraquinones or phthalocyanines which contain additionally at least one reactive amino group.

If desired, the introduction of the substituent in the 2-position of the triazine residue can be performed after the condensation with the parent diamine or after the coupling reaction.

Apart from the residues that can be introduced by acylation there may be mentioned, for example, as fiber-reactive residues, for example, the vinylsulphone group, the β-sulphato- or β-thiosulphato-ethylsulphone, β-thiosulphatopropionylamide group, the β-thiosulphato-ethylsulphonylamide or the sulphonic acid-N,β-sulphatoethylamide group which are introduced into the diazo component in a different manner, for example, by ester or thioester formation.

As diazo components of the formula (4) which contain a fiber-reactive residue that cannot be introduced by acylation, in which, accordingly, the fiber-reactive residue is preferably bound directly to the arylene residue R instead of through an amino group, there may be specially mentioned sulphoesters of the following sulphones:
1-amino-2-methoxy-5-(β-hydroxyethyl)-phenylsulphone, 1-amino- benzene-3- or 4-β-hydroxyethylsulphone, 1-amino-3,6-dimethoxybenzene-4-β-hydroxyethylsulphone, 1-amino-3-methyl-6-methoxybenzene-4-β-hydroxyethylsulphone, 1-amino-4-(β-hydroxyethyl-sulphonylpropionylamino)-methylbenzene, 1-amino-3-(β-hydroxyethyl-sulphonylpropionylamino)-methyl-4-methoxybenzene-6-sulphonic acid, as well as reactive compounds accessible according to Einhorn via the corresponding methylols, for example, 1-amino-4-chloroacetyl-amino-methylbenzene or 1-amino-3-chloroacetylamino-methyl-4-methoxybenzene-6-sulphonic acid.

The diazotization of the amines of the formula (3) used in the present process may be carried out by a method known per se, for example with the aid of hydrochloric acid and sodium nitrite. The coupling with the acetoacetyl compounds of the formula (2) according to this invention is also carried out by a method known per se in a weakly acidic, neutral or alkaline medium.

The compounds according to this invention may also be obtained by first manufacturing an intermediate product by acetoacetylation by means of diketene, for example a compound of the formula

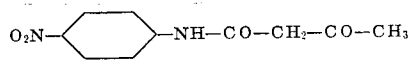

reducing it and condensing it, for example with an amino-anthraquinone sulphonic acid of the formula

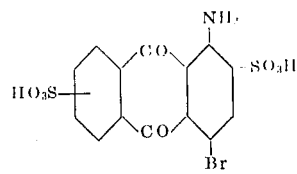

and coupling the compound thus obtained according to this invention with the diazo compound of an amine of the formula (3) to a compound of the formula (1). In this case, too, the partial reactions are carried out by a method known per se. The starting products used are appropriate components of the afore-mentioned parent compounds.

According to another embodiment of the present process an azo compound of the general formula (1), in which X represents an α,β-dihalogenopropionyl residue linked with R through an amino group, especially the α,β-dibromopropionyl residue, is treated with an alkali of dehydrohalogenation of dehydrobromination respectively.

The compounds of the formula (1) obtained by the present process and its embodiments are new. They can be used as dyestuffs and are suitable for dyeing or printing a wide variety of materials, for example, materials of animal origin, for example, leathers, silk and especially wool and chlorinated wool, as well as various man-made fibers, for example, polyamide and polyurethan fibers. They are also suitable for dyeing or printing cellulosic materials, the dyestuffs according to this invention being subjected for fixing to a heat treatment in the presence of an alkali, for example in the presence of sodium carbonate, sodium hydroxide or trisodium phosphate. They dye wool and superpolyamide fibers from a neutral or especially a weakly acid bath, for example from an acetic acid bath. The dyeings and prints obtained with the new dyestuffs on wool display excellent fastness to light and wetting, especially a good stability towards perspiration, washing and fulling.

The dyestuffs according to this invention are also specially suitable for dyeing by the so-called cold pad batch method, according to which polyhydroxylated materials of fibrous structure, such as natural or especially regenerated cellulose, are reacted in the wet state with a fiber-reactive dyestuff in the presence of an acid acceptor at room temperature or at most at a slightly raised temperature.

The dyestuffs according to the invention produce valuable green shades which were difficult to produce in the past. While it is possible to obtain similar shades by physically mixing yellow and blue dyestuffs, such mixtures have the disadvantages of being nonuniform, for example dichroism, irregular deposition on the fiber and nonuniform fastness properties. By virtue of their uniform structure the dyestuffs of this invention are less expensive than the afore-mentioned mixtures, they are readily accessible and have excellent properties in their application.

The following Examples illustrate the invention. Unless otherwise indicated, parts and percentages are by weight.

EXAMPLE 1

42.4 Parts of the sodium salt of 5-(α,β-dibromopropionylamino)-1-aminobenzene-2-sulphonic acid are stirred into 600 parts of water, at 0° to 5°C mixed with 30 parts of hydrochloric acid of 30 percent strength and diazotized by dropping in 25 parts by volume of a 4N-sodium nitrite solution. The diazo suspension is then rendered neutral to Congo red with a small quantity of sodium acetate and added to a suspension of 61.7 parts of the disodium salt of 1-amino-4-(4'-acetoacetylamino-phenylamino)-anthraquinone-2,2'-disulphonic acid in 700 parts of water. The acid liberated during the coupling reaction is neutralized by dropping in a 2N-sodium hydroxide solution so that a pH value between 6.5 and about 8.0 can be maintained. The dyestuff, which has settled out substantially quantitatively on completion of the coupling reaction, is filtered off, washed with a sodium chloride solution of 2 percent strength and dried at 80° to 90°C. The resulting water-soluble dark green powder dyes wool green shades of excellent fastness to wetting and light.

Manufacture of the 1-amino-4-(4'-acetoacetylaminophenylamino)-anthraquinone-2,2'-disulphonic acid: 16.4 parts of anhydrous sodium acetate are added to a neutral solution of 51.1 parts of the disodium salt of 1-amino-4-(4'-aminophenylamino)-anthraquinone-2,2'-disulphonic acid in 700 parts of water and then 9.24 parts of diketene are stirred in dropwise within about 30 minutes; after a further 30 minutes the reaction is complete and furnishes a suspension of 1-amino-4-(4'-acetoacetylamino-phenylamino)-anthraquinone-2,2'-disulphonic acid.

The acetoacetyl derivatives of the following anthraquinone compounds are manufactured in an identical manner:
1-amino-4-(4'-aminophenylamino)-anthraquinone-2,2',6-trisulphonic acid, 1-amino-4-(4'-aminophenylamino)-anthraquinone-2,2'-7-trisulphonic acid, 1-amino-4-(4'-aminophenylamino)-anthraquinone-2,6-disulphonic acid-2'-carboxylic acid, 1-amino-4-(4'-aminophenylamino)-anthraquinone-2,7-disulphonic acid-2'-carboxylic acid, 1-amino-4-(4'-amino-phenylamino)-anthraquinone-2-sulphonic acid-2'-carboxylic acid, 1-amino-4-(4'-aminophenylamino)-anthraquinone-2-sulphonic acid, 1-amino-4-(4'-aminopphenylamino)-anthraquinone-2,2'-disulphonic acid-6'-carboxylic acid and 1-amino-4-(4''-aminostilbeneamino)-anthraquinone-2,2',2''-trisulphonic acid.

Instead of 5-(α,β-dibromopropionylamino)-1-amino-benzene-2-sulphonic acid the following compounds may be used as diazo components:
5- or 4-(α-bromoacrylamino)-1-aminobenzene-2-sulphonic acid, 5- or 4-acrylamino-1-aminobenzene-2-sulphonic acid, 5- or 4-(α,β-dichloropropionylamino)-1-aminobenzene-2-sulphonic acid, 5- or 4-(α-chloroacrylamino)-1-aminobenzene-2-sulphonic acid, 5- or 4-(2,2,3-trichloroacrylamino)-1-aminobenzene-2-sulphonic acid, 4-(α,β-dibromopropionylamino)-1-aminobenzene-2-sulphonic acid, 4-(α,β-dibromopropionyl-amino)-1-aminobenzene-2,5-disulphonic acid, 3-(α,β-dibromo-propionylamino)-1-aminobenzene-4,6-disulphonic acid, 4-(chloroacetylamino)-1-aminobenzene-2-sulphonic acid or 4-bromoacetylamino-1-aminobenzene-2-sulphonic acid,

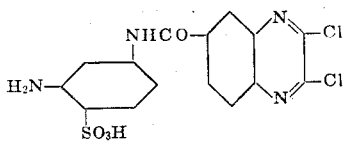

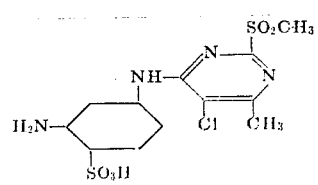

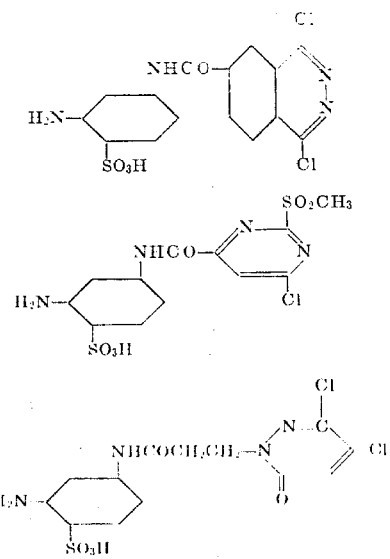

According to Example 1 there are obtained from the acetoacetylated anthraquinone dyestuffs of the first column of the following Table and the diazo components of the second column (which carry the fiber-reactive residues shown in the third column) further dyestuffs which produce the shades shown in the fourth column. The following symbols have been used:

Diazo components

A = 1,5-diaminobenzene-2-sulphonic acid
B = 1,4-diaminobenzene-2-sulphonic acid
C = 1,4-diaminobenzene-2,5-disulphonic acid
D = 2,4-diaminobenzene-1,5-disulphonic acid
E = 1,4-diamino-benzene-2,6-disulphonic acid
F = 1-amino-2-methoxy-5-(β-hydroxyethyl)-phenylsulphone.

Reactive groups

I = α,β-dibromopropionyl
II = α-bromoacryl
III = α,β-dichloropropionyl
IV = α-chloroacryl
V = acryl
VI = chloroacetyl
VII = bromoacetyl
VIII = 1-methoxy-3,5-dichloro-s-triazine
IX =

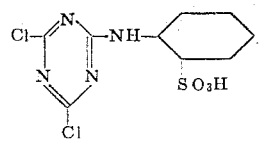

| | Diazo component | Reactive group | Shade |
|---|---|---|---|
| 1-Amino-4-(4'-aminophenylamino)-anthraquinone-2,2'-disulphonic acid | A | I | green |
| " | A | II | " |
| " | B | I | " |
| " | C | I | " |
| " | C | VIII | " |
| " | A | trichloroacryl | " |
| Mixture of 1-amino-4-(4'-aminophenylamino)-anthraquinone-2',2,6- and 2',2,7- | A | I | " |

| | | | |
|---|---|---|---|
| trisulphonic acid | | | |
| " | A | II | " |
| " | A | III | " |
| " | A | IV | " |
| " | A | V | " |
| Mixture of 1-amino-4-(4'-aminophenylamino)-anthraquinone-2',2,6- and 2',2,7-trisulphonic acid | A | VI | green |
| " | A | VII | " |
| " | C | I | " |
| " | C | II | " |
| " | C | VIII | " |
| " | F | sulphato-ester | 37 |
| 1-Amino-4-(4'-aminophenylamino)-anthraquinone-2,2'-6-trisulphonic acid | A<br>A | I<br>II | "<br>" |
| 1-Amino-4-(4'-aminophenylamino)-anthraquinone-2,2',7- trisulphonic acid | A<br>A<br>F | I<br>II<br>sulphato-ester | "<br>"<br>" |
| 1-Amino-4-(4'-aminophenylamino)-anthraquinone-2-sulphonic acid | A<br>C<br>F | I<br>I<br>sulphato-ester | "<br>"<br>" |
| 1-Amino-4-(4''-aminodiphenylamino)-anthraquinone-2,3''-disulphonic acid | A | I | " |
| 1-Amino-4-(4'-aminophenylamino)-anthraquinone-2,2'-disulphonic acid-6'-carboxylic acid | A | I | grayish blue |
| 1-Amino-4-(4''-aminostilbeneamino)-anthraquinone-2,2',2''-trisulphonic acid | A | I | yellowish green |
| 1-Amino-4-(4'-aminophenylamino)-anthraquinone-2,3'-disulphonic acid | A<br>B<br>C<br>A | I<br>I<br>I<br>IX | green<br>"<br>"<br>" |
| 1-Amino-4-(4'-amino-2',3',5',6'-tetramethylphenylamino)- anthraquinone-2,6-disulphonic acid | A<br>C | I<br>I | dull blue<br>" |
| 1-Amino-4-(3'-amino-2',4',6'-trimethylphenylamino)-anthraquinone-2,5-disulphonic acid | A | I | " |
| 1-Amino-4-(3'-amino-4'-chlorophenylamino)-anthraquinone-2,5'-disulphonic acid | A | I | dull blue |
| Mixture of 1-amino-4-(4'-aminophenylamino)-anthraquinone-2'-carboxylic acid-2,6- and -2,7-disulphonic acid | A<br>A<br>A | I<br>II<br>V | green<br>"<br>" |
| " | B | I | " |
| " | C | I | " |
| " | C | VIII | " |
| " | A | IX | " |
| " | F | sulphato-ester | " |

EXAMPLE 2

47.3 Parts of the secondary condensation product from 1-aminobenzene-2-sulphonic acid, 1,3-diaminobenzene-4-sulphonic acid and cyanuric chloride, of the formula

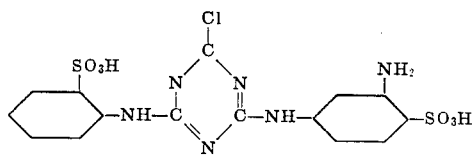

are mixed with 300 parts of water, 200 parts of ice and 25 parts of hydrochloric acid of 30 percent strength and -diazotized by stirring in dropwise 25 parts by volume of 4N-sodium nitrite solution. The resulting diazo suspension is added to a neutral suspension of the 1-amino-4-('-acetoacetylamino-phenylamino)-anthraquinone-2,2'-disulphonic acid mentioned in Example 1, while neutralizing the acid liberated by the coupling reaction by dropping in 2N-sodium hydroxide so as to maintain a pH value of from 6.5 to 8. On completion of the coupling the dyestuff is quantitatively salted out with sodium chloride, filtered off and dried at 80° to 90°C. The resulting dyestuff of the formula

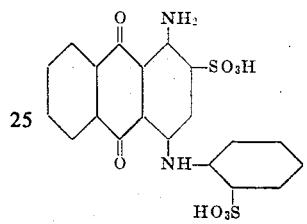

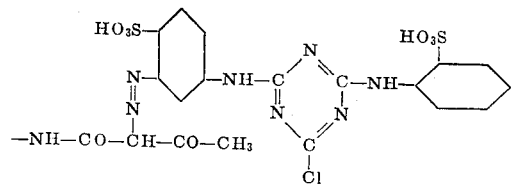

is soluble in water and dyes hydroxylated textile materials green shades fast to wetting and light.

Similar green dyestuffs are obtained by using as diazo components the secondary condensation products of cyanuric chloride with the compounds listed in the following Table.

As a rule, the compounds shown in column I are condensed first and those in column II subsequently with cyanuric chloride. In some cases the condensations may be performed in the reverse order.

| I | II |
|---|---|
| 1-Aminobenzene-3-sulphonic acid | 1,3-Diaminobenzene-4-sulphonic acid |
| 1-aminobenzene-4-sulphonic acid | " |
| 1-aminobenzene-2,5-disulphonic acid | " |
| 1-aminobenzene-2,4-disulphonic acid | 1,3-diaminobenzene-4-sulphonic acid |
| 1-aminobenzene-3-carboxylic acid | " |
| hydroxybenzene | " |
| 1-hydroxybenzene-4 sulphonic acid | " |
| methanol | " |
| isopropanol | " |
| glycolmonomethylether | " |
| glycolmonoethylether | " |
| 4-amino-4'-acetylaminostilbene-2,2'-disulphonic acid | " |
| aniline-ω-methanesulphonic acid | " |
| N-methylaniline-3- or -4-sulphonic acid | " |
| 2-aminonaphthalene-4,6,8-trisulphonic acid | " |
| 1-aminobenzene-2-sulphonic acid | 1,4-diaminobenzene-2,5-disulphonic acid |
| methanol | " |

| | |
|---|---|
| isopropanol | " |
| glycolmonoethylether | " |
| hydroxybenzene | " |
| 1-hydroxybenzene-4-sulphonic acid | " |
| 1-aminobenzene-3-sulphonic acid | " |
| " | 1,4-diaminobenzene-2,6-disulphonic acid |
| " | 1,3-diaminobenzene-4,6-disulphonic acid |
| methanol | " |
| isopropanol | " |
| hydroxybenzene | " |
| 1-hydroxybenzene-4-sulphonic acid | " |
| 1-hydroxybenzene-4-sulphonic acid | 1,4-diaminobenzene-5-sulphonic acid |
| 1-aminobenzene-2,5-disulphonic acid | " |
| methanol | " |
| isopropanol | " |
| hydroxybenzene | " |
| 1-hydroxybenzene-4-sulphonic acid | " |

EXAMPLE 3

23.1 Parts of 1-amino-2-methoxybenzene-5-β-hydroxyethylsulphone are converted into the acid sulphuric acid ester by being heated with 40 parts of sulphuric acid of 60 percent strength. The batch is then stirred with 300 parts of ice water and diazotized by dropping in 25 parts by volume of 4N-sodium nitrite solution at 0° to 5°C. The clear diazo solution is run into the suspension of 1-amino-4-(4'-acetoacetylamino-phenylamino)-anthraquinone-2,2'-disulphonic acid prepared as described in Example 1 and then sodium hydrogencarbonate is added until the coupling is complete. The dyestuff is salted out with potassium chloride, filtered off and dried at 50° to 60°C. It forms a dark green powder which dissolves in water and dyes wool and cellulose shades that are fast to wetting and light.

When 1-amino-2-methoxybenzene-5-β-hydroxyethyl-sulphone is replaced by 1-aminobenzene-3- or -4-β-hydroxy-ethylsulphone or by 1-amino-3,6-dimethoxybenzene-4-β-hydroxyethylsulphone or by 1-amino-3-methyl-6-methoxybenzene-4-β-hydroxyethyl-sulphone, green dyestuffs that produce similar shades are obtained.

EXAMPLE 4

16 Parts of anhydrous sodium acetate are added at 90° to 95°C to a neutral solution of 51.1 parts of the disodium salt of 1-amino-4-(4'-aminophenylamino)-anthraquinone-2,3'-disulphonic acid in 700 parts of water, and 25 parts of diketene are stirred in until the acylation is complete. The solution is allowed to cool and the dyestuff intermediate salted out with sodium chloride, filtered off, washed with a sodium chloride solution and dried.

By the identical method the acetoacetyl derivatives of the following anthraquinone compounds were manufactured:

1-amino-4-(4''-aminodiphenylamino)-anthraquinone-2,3''-disulphonic acid, 1-amino-4-(3'-amino-4'-chlorophenylamino)-anthraquinone-2,5'-disulphonic acid, 1-amino-4-(4'-amino-2', 3',5',6'-tetramethylphenylamino)-anthraquinone-2,6- and -2,7-disulphonic acid, 1-amino-4-(3'-amino-2',4',6'-trimethylphenylamino)-anthraquinone-2,5'-disulphonic acid and 1,4-bisphenylamino-anthraquinone-4',4''-diamino-3',3''-disulphonic acid.

EXAMPLE 5

33.6 Parts of the condensation product from 1,3-diaminobenzene-4-sulphonic acid and cyanuric chloride of the formula

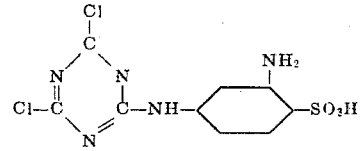

in 300 parts of water and 200 parts of ice are mixed with 25 parts of hydrochloric acid of 30 percent strength and diazotized by stirring in dropwise 25 parts by volume of a 4N-sodium nitrite solution.

The resulting diazo suspension is added to a neutral solution (cooled with ice to 0° to 5°C) of 1-amino-4-(4'-acetoacetylaminophenylamino)-anthraquinone-2,6-disulphonic acid-2'-carboxylic acid and then sodium hydrogencarbonate is added until the coupling is complete. Then 12.2 parts of monoethanolamine are added, the temperature is raised to 20° to 25°C and the batch is stirred for 2 hours. The dyestuff is salted out with sodium chloride, filtered off and dried at 80 to 90°C; it forms a green water-soluble powder which dyes cellulose fibers shades that are fast to wetting and light.

Instead of ethanolamine there may be used aniline, N-methyl-aniline, N-(β-hydroxyethyl)-aniline or ammonia.

EXAMPLE 6

A neutral solution in 150 parts of water of 7 parts of the dyestuff of the formula

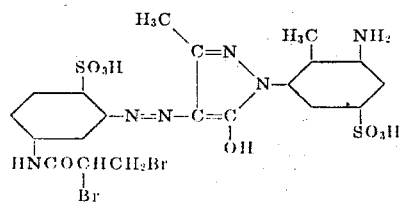

is diazotized by adding to it 10 parts by volume of a 30 percent solution of α-naphthalenesulphonic acid and 10 parts of a N-sodium nitrite solution and then combined with a solution of 5.73 parts of 1-amino-4-(4'-acetoacetyl-aminophenylamino)-anthraquinone-2,2'-disulphonic acid in 100 parts of water and 20 parts by volume of a 2N-sodium carbonate solution. The resulting coupling reaction produces the dyestuff of the formula

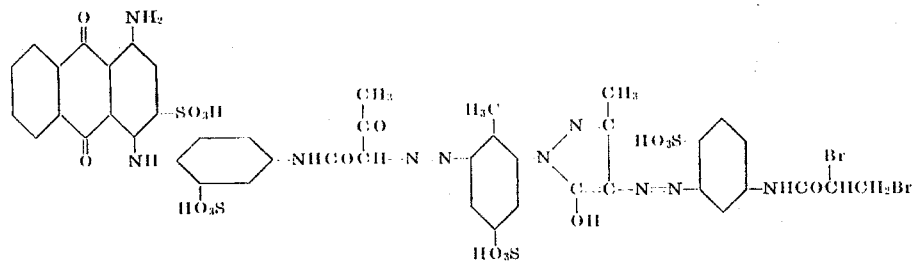

which is salted out with sodium chloride, filtered off and dried at 70° to 80°C under vacuum; it dyes wool green shades fast to wetting and light.

EXAMPLE 7

On completion of the coupling the dyestuff solution of Example 1 is adjusted with 10N-sodium hydroxide solution to a pH value of 12, while maintaining the temperature between 10° to 15°C by adding ice. After about 15 minutes the batch is neutralized to ph = 7.0 with hydrochloric acid, and the dyestuff is salted out with sodium chloride, filtered off and dried at 70° to 80°C under vacuum.

The resulting dyestuff, which in the form of the free acid corresponds to the formula

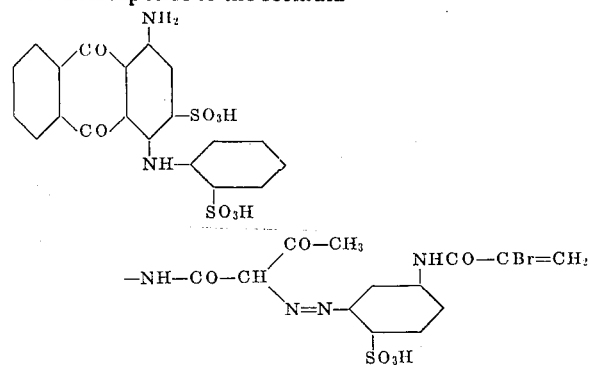

dyes wool green shades having excellent fastness properties to wetting and light.

Dyeing Example 1

100 Parts of knitting wool are immersed at 50° to 80°C in a dyebath containing in 3000 parts of water 10 parts of crystalline sodium sulphate, 6 parts of acetic acid of 40 percent strength, 0.5 part of the adduct of oleylamine and ethylene oxide mentioned below, and 2 parts of the dyestuff described in Example 1. During half an hour the bath is raised to the boil and then dyeing at the boil is carried out for one hour, the wool is rinsed and dried. It is dyed a level green shade.

Manufacturing the ethylene oxide adduct

A mixture of 100 parts of commercial oleylamine and 1 part of finely divided sodium is heated to 140°C, whereupon ethylene oxide is injected at 135° to 140°C. When ethylene oxide is being absorbed rapidly, the reaction temperature is lowered to 120° to 125°C and the injection of ethylene oxide is continued until 113 parts thereof have been absorbed. The resulting reaction product gives a substantially clear solution in water.

Dyeing Example 2

A cotton fabric is impregnated on the padder with a solution of 2 parts of the dyestuff of Example 2 in 100 parts of water and the excess liquid is expressed to a weight increase of the fabric of 75 percent.

The fabric impregnated in this manner is dried, then impregnated at room temperature with a solution containing per liter 10 g of sodium hydroxide and 300 g of sodium chloride, squeezed to a weight increase of 75 percent, steamed for 60 seconds at 100° to 101°C, rinsed, soaped for 15 minutes in a 0.3 percent solution of a non-ionic detergent at the boil, rinsed and dried.

The resulting dyeing is fast to boiling. When instead of a cotton fabric a spun rayon fabric is used, a similarly good result is obtained.

Printing Instruction

A mixture of 2 parts of the dyestuff obtained in Example 5 and 20 parts of urea is dissolved in 28 parts of water and this solution is stirred into 40 parts of a sodium alginate thickening of 5 percent strength. Then 10 parts of a sodium carbonate solution of 10 percent strength are added.

A cotton fabric is printed with this printing paste on a roller printing machine, dried and the print is steamed for 1 minute at 105°C. The printed fabric is then thoroughly rinsed in cold and in hot water and dried.

Dyeing Example 3

2 Parts of the dyestuff of Example 1 are dissolved in 95 parts of water by boiling for a short time. The solution is allowed to cool and 5 parts of 10N-sodium hydroxide solution are added to the dyestuff solution. The resulting solution is used to impregnate a viscose rayon fabric which is then squeezed to a weight increase of 75 percent, reeled, and the roll is enveloped with a plastic foil and left to itself for 48 hours at 20°C. The fabric is then washed in cold and in boiling water and dried. The resulting green dyeing has good fastness to washing and light.

When the process described above is carried out with the same dyestuff which contains instead of the $\alpha,\beta$-dibromopropionyl group the $\alpha,\beta$-dichloropropionyl group or the acryl group, green dyeings having similar good properties are obtained.

Dyeing Example 4

3 Parts of the dyestuff of Example 3, which contains as diazo component 1-aminobenzene-3-$\beta$-hydroxyethylsulphone instead of 1-amino-2-methoxybenzene-5-$\beta$-hydroxyethylsulphone, are dissolved in 100 parts of water. A fabric of mercerized cotton is impregnated with this solution and then squeezed to a weight increase of 60 percent. Then, without intermediate drying, the fabric is impregnated with a solution of sodium chloride containing sodium hydroxide solution and squeezed to an additional weight increase of 30 percent referred to the dry weight of the textile material. The fabric is then reeled, enveloped in a plastic foil and kept for 4 hours at room temperature. The sodium chloride and the alkali are then removed by a thorough rinse, the material is boiled for 10 minutes in water, rinsed until the water runs clear and dried.

A level dyeing is obtained which has good fastness to light and washing.

Dyeing Example 5

A solution of 4 parts of the dyestuff of Example 3 in 100 parts of water is used to impregnate a viscose spun rayon fabric. The fabric is then squeezed to a weight increase of 85 percent, and, without intermediate drying, impregnated with a solution of 20 parts of sodium chloride, 2.2 parts of sodium hydroxide (of 100 percent purity) in 110 parts of water and squeezed to an additional weight increase of 25 percent referred to the dry weight of the fabric. The fabric is reeled, enveloped in a plastic foil and left to itself for 12 hours at room temperature. The fabric is then rinsed with cold and with boiling water and dried. A level drying fast to washing results.

When the fabric is washed after lying for only 8 hours, an equally good but somewhat paler dyeing is obtained.

Dyeing Example 6

2 Parts of the dyestuff of Example 5 (1st and 2nd paragraph) are dissolved in 95 parts of water. After cooling, 5 parts of 10N-sodium hydroxide solution and 2 parts of sodium chloride are added to the dyestuff solution. A cotton fabric is impregnated with this solution, then squeezed to a weight increase of 60 percent and kept for 24 hours at room temperature in the wet state, then washed with cold and with boiling water and dried. The resulting dyeing is fast to washing and light.

Dyeing Example 7

4 Parts of the dyestuff of Example 5, which contains an $H_2N$ group instead of the monoethanolamine residue on the triazine ring, are dissolved in 100 parts of water. The solution is allowed to cool and then used to impregnate a mercerized cotton fabric to a weight increase of 60 percent and then, without intermediate drying, the cotton fabric is impregnated with another solution which is prepared by dissolving 20 parts of sodium chloride and 2.2 parts of sodium hydroxide (of 100 percent purity) in 110 parts of water, with the roller pressure on the padder so adjusted that an additional weight increase of 30 percent is achieved. The fabric is then reeled, wrapped in a foil of polyethylene and left to itself for 12 hours at room temperature, then given a thorough rinse in cold and in warm water and finally for 10 minutes in boiling water, rinsed clear and dried. The resulting green dyeing has good fastness to light and washing.

Dyeing Example 8

2 Parts of the dyestuff of Example 6 are dissolved in 100 parts of water. Immediately prior to use the solution is mixed with 5 parts of 10N-sodium hydroxide solution and used to impregnate a viscose rayon fabric. The fabric is then squeezed to a weight increase of 70 percent, reeled, kept for 4 hours at 30°C in the wet state and then thoroughly rinsed in hot and in cold water.

The resulting green dyeing is fast to washing and light.

Dyeing Example 9

2 Parts of the dyestuff of Example 7 are dissolved in 98 parts of water and 2 parts of 10N-sodium hydroxide solution are added to the dyestuff solution. A viscose rayon fabric is impregnated with this solution, squeezed to a weight increase of 100 percent, reeled and after leaving the fabric for 4 hours it is rinsed in cold and in boiling water. The resulting green dyeing is fast to washing and light.

When a fabric of mercerized cotton is dyed as described above, an equally good result is obtained.

When the sodium hydroxide solution is replaced by 2 parts of sodium metasilicate or 2 parts of lithium hydroxide, proceeding otherwise as described above, similar good results are obtained.

We claim:

1. An azo compound of the formula

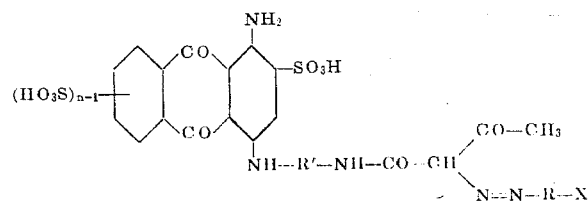

containing at least two sulfonic acid groups; in which X represents a fiber-reactive group selected from the group consisting of $\alpha,\beta$-unsaturated or halogenated $C_{1-4}$-carbacyl, 3-nitro- or 3,5-dinitro-4-chloro-benzoyl or -benzenesulfonyl, 4,5-dichloro-1-pyridazone, $-CH_2-NH-CO-CH_2Cl$, vinylsulphone, $\beta$-sulphato- or $\beta$-thiosulphato-ethylsulphone, $\beta$-thiosulphatopropionylamide, $\beta$-thiosulphatoethylsulphonylamide, sulphonic acid-N,$\beta$-sulphatoethylamide and 5- or 6-membered heterocyclic ring selected from the group consisting of a pyridazine, pyrimidine, triazine, benzoxozole, benzthiazole, phthalazine, quinazoline or quinoxaline ring and which contains at least one fiber-reactive group selected from the group consisting of chlorine, bromine and alkylsulfonyl, and which is bound to R through an $-NH-$ or $-NH-CO-$ bridge; and may be further substituted by $-NH_2$, $-SH$, $-OH$, $-NH-$alkyl, alkoxy, thioalkoxy, dialkylamino, phenyl- or sulfophenylamino, phenoxy, phenylthio, alkyl, phenyl, nitro or cyano groups wherein alkyl is from one to four carbon atoms and may be substituted by $-OH$ or alkoxy, $n = 1$ or 2, R' is phenyl, diphenyl or stilbene, or phenyl, diphenyl or stilbene substituted by chloro, methyl, carboxylic acid or sulfonic acid and R is phenyl or sulfophenyl or phenyl or sulfophenyl substituted by chloro, methyl, methoxy, hydroxy or sulfonic acid.

2. An azo compound as claimed in claim 1, in which X represents $\alpha,\beta$-dibromopropionyl, $\alpha$-bromoacryl, 1-methoxy-3-chloro-s-triazin(5)-yl, 1-($\beta$-ethoxy)-ethoxy-3-chloro-s-triazin(5)-yl or 1-sulphophenylamino-3-chloro-s-triazin(5)-yl group bound to R through an $-NH-$ group.

3. A dyestuff as claimed in claim 1 of the formula

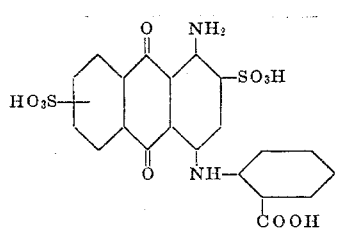

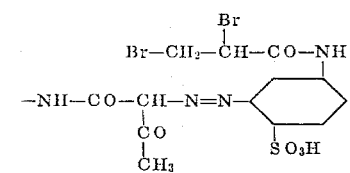

4. The dyestuff as claimed in claim 1 of the formula

5. A dyestuff as claimed in claim 1 of the formula

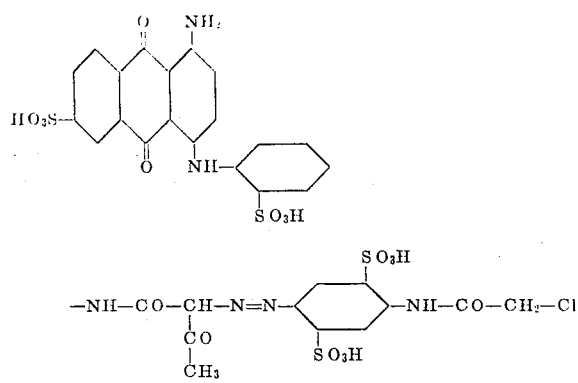

6. The dyestuff as claimed in claim 1 of the formula

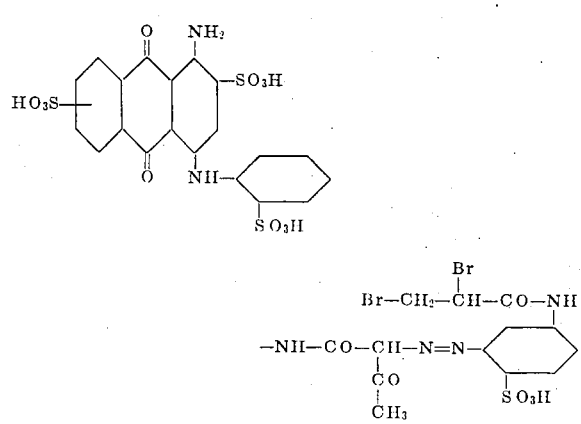

7. The dyestuff as claimed in claim 1 of the formula

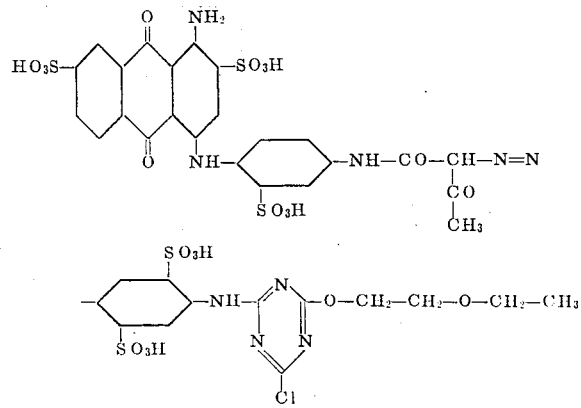

8. The dyestuff as claimed in claim 1 of the formula

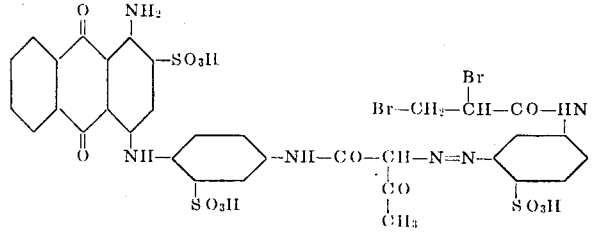

9. A dyestuff as claimed in claim 1 of the formula

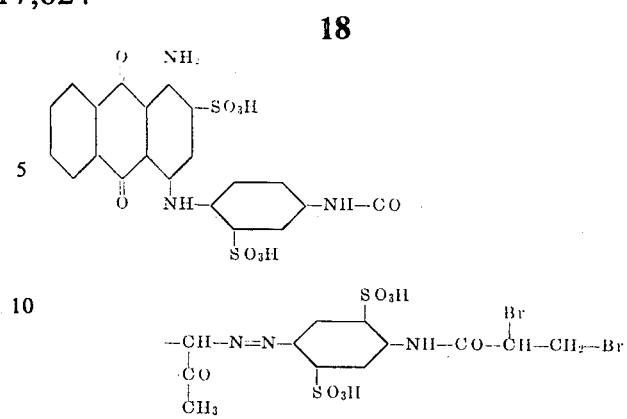

10. A dyestuff as claimed in claim 1 of the formula

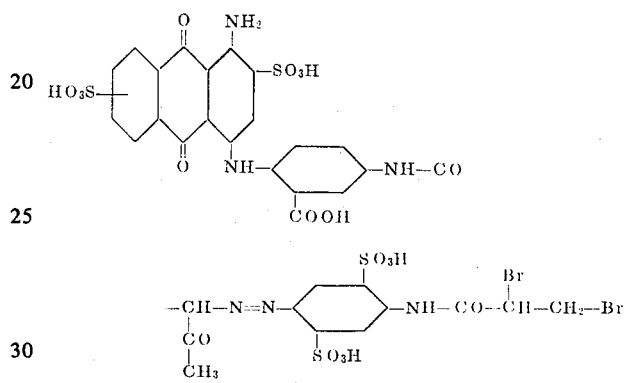

11. The dyestuff as claimed in claim 1 of the formula

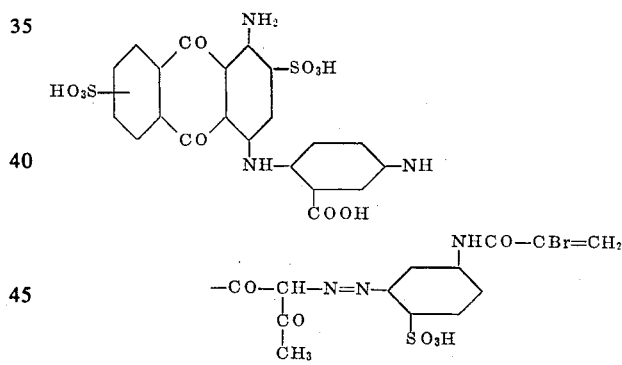

12. A dyestuff as claimed in claim 1 of the formula

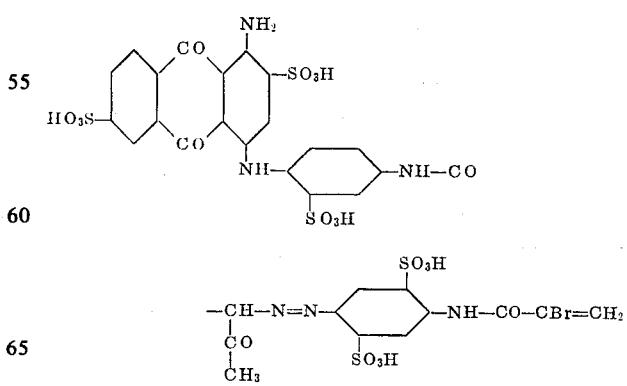

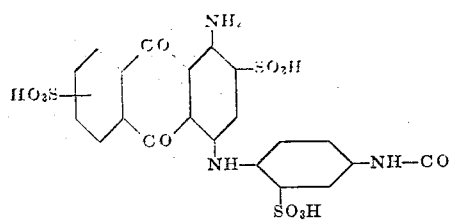
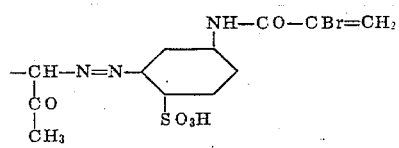
13. The dyestuff as claimed in claim 1 of the formula
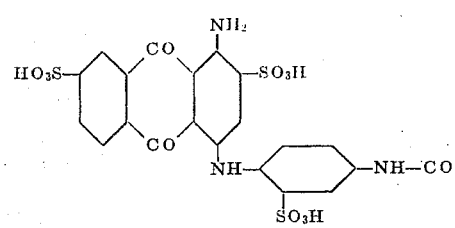
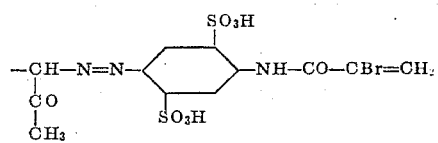
14. The dyestuff as claimed in claim 1 of the formula
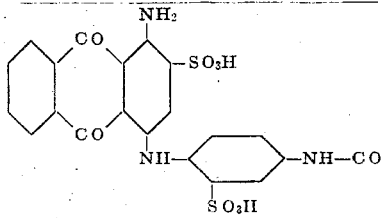
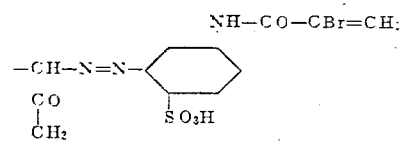
15. The dyestuff as claimed in claim 1 of the formula
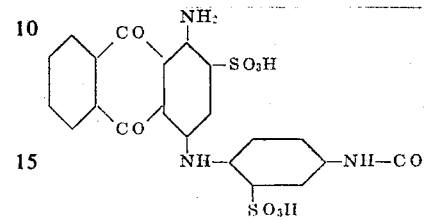
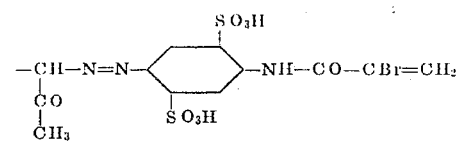
16. A dyestuff as claimed in claim 1 of the formula
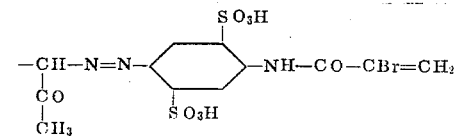
* * * * *